(12) United States Patent
Horikawa et al.

(10) Patent No.: US 11,621,413 B2
(45) Date of Patent: Apr. 4, 2023

(54) POSITIVE ELECTRODE MATERIAL FOR LITHIUM ION SECONDARY BATTERY

(71) Applicants: TOYOTA JIDOSHA KABUSHIKI KAISHA, Toyota (JP); NATIONAL UNIVERSITY CORPORATION OKAYAMA UNIVERSITY, Okayama (JP)

(72) Inventors: Daisuke Horikawa, Toyota (JP); Yuji Yamamoto, Toyota (JP); Takashi Teranishi, Okayama (JP)

(73) Assignees: TOYOTA JIDOSHA KABUSHIKI KAISHA, Toyota (JP); NATIONAL UNIVERSITY CORPORATION OKAYAMA UNIVERSITY, Okayama (JP)

( * ) Notice: Subject to any disclaimer, the term of this patent is extended or adjusted under 35 U.S.C. 154(b) by 408 days.

(21) Appl. No.: 16/897,407

(22) Filed: Jun. 10, 2020

(65) Prior Publication Data

US 2021/0005887 A1   Jan. 7, 2021

(30) Foreign Application Priority Data

Jul. 1, 2019   (JP) .............................. JP2019-123080

(51) Int. Cl.
| | |
|---|---|
| *H01M 4/36* | (2006.01) |
| *H01M 10/0525* | (2010.01) |
| *H01M 4/48* | (2010.01) |
| *H01M 4/131* | (2010.01) |
| *H01M 4/485* | (2010.01) |
| *H01M 4/02* | (2006.01) |

(52) U.S. Cl.
CPC ........... *H01M 4/366* (2013.01); *H01M 4/131* (2013.01); *H01M 4/483* (2013.01); *H01M 4/485* (2013.01); *H01M 10/0525* (2013.01); *H01M 2004/028* (2013.01)

(58) Field of Classification Search
None
See application file for complete search history.

(56) References Cited

U.S. PATENT DOCUMENTS

2007/0231691 A1   10/2007   Abe et al.

FOREIGN PATENT DOCUMENTS

| JP | 2007-273108 A | 10/2007 |
| JP | 2015-099646 A | 5/2015 |
| JP | 2017152294 | * 8/2017 |

OTHER PUBLICATIONS

Machine Translation of JP2017152294 (Year: 2017).*

* cited by examiner

*Primary Examiner* — Wyatt P McConnell
(74) *Attorney, Agent, or Firm* — Oliff PLC

(57) ABSTRACT

A positive electrode material which is used in a positive electrode of a lithium ion secondary battery disclosed here includes a positive electrode active material including a compound capable of storing and releasing lithium ions, a first coating material disposed on at least a part of the surface of the positive electrode active material, and a second coating material disposed on at least a part of the surface of the positive electrode active material. The positive electrode material is characterized in that the first coating material contains a nickel oxide having a rock salt structure, and the second coating material contains a titanium oxide.

5 Claims, 3 Drawing Sheets

POSITIVE ELECTRODE MATERIAL FOR LITHIUM ION SECONDARY BATTERY

CROSS-REFERENCE TO RELATED APPLICATIONS

The present application claims priority on the basis of Japanese Patent Application No. 2019-123080, which was filed on Jul. 1, 2019, and the entire contents of that application are incorporated by reference in the present specification.

BACKGROUND OF THE INVENTION

1. Field of the Invention

The present invention relates to a positive electrode material for a lithium ion secondary battery. More specifically, the present invention relates to a positive electrode material including a positive electrode active material and coating material containing a nickel oxide and a titanium oxide on the surface of the positive electrode active material.

2. Description of the Related Art

Due to being lightweight and exhibiting high energy density, secondary batteries such as lithium ion secondary batteries and nickel hydrogen batteries have been advantageously used as so-called portable power sources for personal computers, hand-held terminals, and the like, and also as power supplies for vehicle propulsion. Of these, lithium ion secondary batteries exhibit high current density and high battery capacity per unit mass, and are therefore expected to become more commonly used as high output power sources for powering vehicles such as electric vehicles (EV), hybrid vehicles (HV) and plug in hybrid vehicles (PHV).

Configurations of positive electrode materials contained in this kind of lithium ion secondary battery have been subjected to a variety of investigations in view of intended uses. For example, patent documents below disclose features relating to configurations of positive electrode materials.

Specifically, JP2015-99646A, for example, discloses a positive electrode material having a substance different from the positive electrode active material is disposed on the surface of the positive electrode active material. In the positive electrode active material (positive electrode material) disclosed in this patent document, the surface of a particle of a lithium transition metal composite oxide that mainly constitutes the active material is coated with a Ti compound. In addition, it is indicated that the output characteristics of the positive electrode active material are improved by coating with a Ti compound.

Meanwhile, JP2007-273108A discloses washing a positive electrode active material including a lithium nickel composite oxide with water under specific conditions. In addition, this document indicates that because impurities and by-products attached to a surface are sufficiently removed by washing with water, the positive electrode active material exhibits excellent thermal stability.

SUMMARY

Incidentally, it is said that output characteristics of lithium ion secondary batteries readily decrease depending on the temperature conditions under which the batteries are operated. For example, under low temperature conditions such as lower than 0° C. in particular, the degree of mobility of lithium ions in an electrolyte (an electrolyte solution or a solid electrolyte) may be lower than under normal temperature conditions. Therefore, there are concerns that an insufficient amount of lithium ions will be supplied to the surface of a positive electrode active material during charging and discharging. This obstructs the smooth progression of battery reactions in lithium ion secondary batteries, and the output characteristics of lithium ion secondary batteries may, in some cases, be significantly reduced under such low temperature conditions. For example, there is a need for techniques for improving low temperature output characteristics of lithium ion secondary batteries in cases where lithium ion batteries are used in cold regions (for example, regions where the minimum temperature in winter is lower than −10° C.).

However, techniques disclosed in the patent documents listed above do not take into account cases where batteries are operated under such low temperature conditions. That is, it must be said that it is difficult for the techniques disclosed in these patent literatures to provide lithium ion secondary batteries that can exhibit excellent output characteristics under such low temperature conditions. In addition, if a positive electrode active material is washed with water, depending on the washing conditions, the positive electrode active material may react with the water and produce an oxide (for example, a transition metal oxide), as disclosed in JP2007-273108A. If this species of oxide is present, there are concerns that lithium ion insertion/extraction in the positive electrode active material will be obstructed. This can be a primary cause of a reduction in low temperature output characteristics.

Therefore, with such circumstances in mind, an object of the present invention is to provide a positive electrode material having a configuration capable of exhibiting excellent battery performance (for example, low temperature output characteristics and the like). Another object of the present invention is to provide a lithium ion secondary battery provided with the positive electrode material.

The positive electrode material which is used in a positive electrode of a lithium ion secondary battery disclosed here includes a positive electrode active material including a compound capable of storing and releasing lithium ions, a first coating material disposed on at least a part of a surface of the positive electrode active material, and a second coating material disposed on at least a part of the surface of the positive electrode active material. The first coating material contains a nickel oxide having a rock salt structure, and the second coating material contains a titanium oxide.

According to a positive electrode material having such a configuration, it is possible to improve the low temperature output characteristics of a lithium ion secondary battery.

In addition, in a preferred aspect of the positive electrode material which is used in a positive electrode of a lithium ion secondary battery disclosed here, the nickel oxide is a nickel oxide represented by the formulae NiO and $Ni_{1-\delta}O$, wherein $\delta$ is a real number that satisfies $0<\delta<1$.

The titanium oxide preferably includes at least one titanium oxide of the titanium oxides (1) and (2) below:

(1) a titanium oxide represented by $TiO_2$ or $Ti_nO_{2n-1}$, wherein n is an integer of 3 or more, and is typically 3 or more and 10 or less, and (2) a composite oxide containing Li and Ti.

By disposing a nickel oxide and a titanium oxide having such compositions at the surface of the positive electrode active material, it is possible to more effectively improve the low temperature output characteristics of the lithium ion secondary battery.

Furthermore, in a preferred aspect of the positive electrode material which is used in a positive electrode of a lithium ion secondary battery disclosed here, the second coating material is formed on the disposed first coating material on at least a part of the surface of the positive electrode active material.

Forming the second coating material on the formed first coating material, it is possible to improve the lithium ion insertion/extraction efficiency in the positive electrode active material.

In addition, in a preferred aspect of the positive electrode material which is used in a positive electrode of a lithium ion secondary battery disclosed here, the first coating material has an average thickness of 0.4 nm or more and 55 nm or less based on an electron microscope observation.

Furthermore, with respect to 100% by weight of the total amount of the positive electrode active material, the total amount of Ti contained in the second coating material is preferably an amount corresponding to 0.005% or more and 6% by weight.

The average thickness based on an electron microscope observation of the first coating material within the specified range provides more favorable lithium ion insertion/extraction. In addition, the total amount of Ti contained in the second coating material within the range mentioned above can improve the lithium ion insertion/extraction efficiency in the positive electrode active material.

DETAILED DESCRIPTION OF THE PREFERRED EMBODIMENTS

Preferred embodiments of this invention will now be explained while referring to the figures as appropriate. Moreover, matters which are essential for carrying out the invention (for example, other battery-constituting elements and ordinary battery production processes that do not characterize this invention) and which are matters other than those explicitly mentioned in this specification (for example, the composition and form of the positive electrode material) are matters that a person skilled in the art could understand to be matters of design on the basis of the prior art in this technical field. The present invention can be carried out on the basis of the matters disclosed in the present specification and common general technical knowledge in this technical field. Moreover, cases where numerical ranges in the present specification are written as A to B (here, A and B are arbitrary numbers) mean not less than A and not more than B. The expression not less than A and not more than B encompasses a range that is greater than A and a range that is less than B.

Moreover, in the present specification, the term "lithium ion secondary battery" means a secondary battery in which movement of charge is borne by lithium ions in an electrolyte (a power storage device capable of being repeatedly charged and discharged). The term "active material" means a material capable of storing and releasing (typically inserting and extracting) a chemical species that serves as a charge carrier (a lithium ion) in the lithium ion secondary battery.

More detailed explanations will now be given of several preferred embodiments of the positive electrode material for a lithium ion secondary battery disclosed here (hereinafter referred to simply as "positive electrode material"). Moreover, the present invention is in no way limited to these embodiments.

Figure 1:
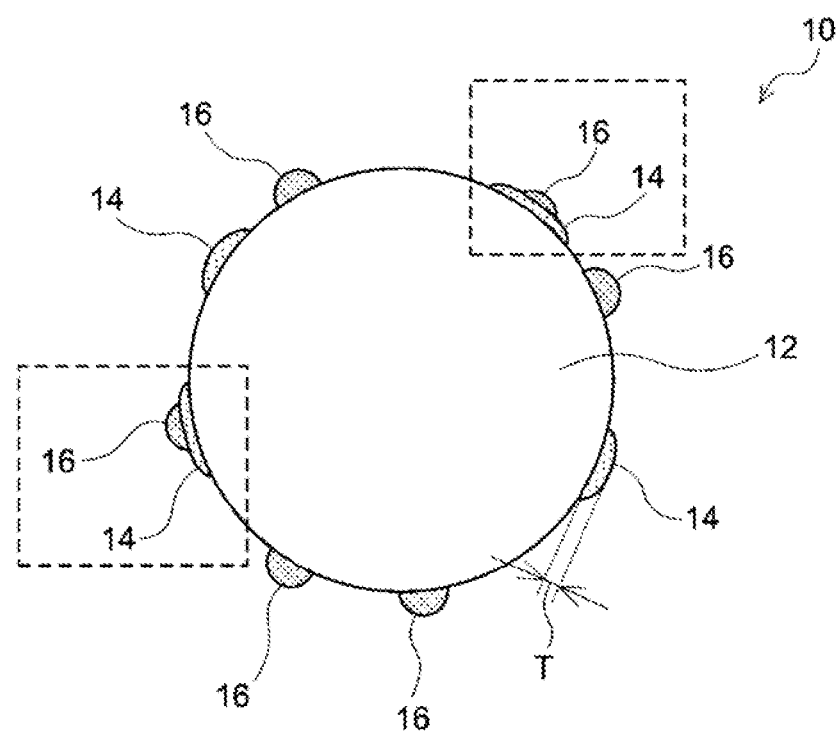
FIG. 1 is a schematic diagram that shows a positive electrode material according to one embodiment.

First, the positive electrode material disclosed here will be explained with reference to FIG. 1. FIG. 1 schematically illustrates the positive electrode material disclosed here.

As shown in the diagram, the positive electrode material 10 disclosed here includes a positive electrode active material 12, a first coating material 14 disposed on at least a part of the surface of the positive electrode active material 12, and a second coating material 16 disposed on at least a part of the surface of the positive electrode active material 12. Here, the term "disposed" means that the coating material in question is present on at least a part of the surface of the active material (particle), and is not limited to a form whereby the coating material and the active material (particle) are bound to each other.

A lithium transition metal composite oxide which is typically used as a positive electrode active material of a lithium ion secondary battery and which contains at least nickel element can be used without particular limitation as the positive electrode active material 12.

In terms of crystal structure, it is possible to use lithium transition metal composite oxides having a variety of crystal structures similar to those of conventional positive electrode active material, for example a layered rock salt structure, a rock salt structure, a spinel structure, an olivine structure or a perovskite structure.

A lithium transition metal composite oxide having a layered rock salt structure or a spinel structure is particularly preferred as the positive electrode active material 12.

Specific examples of lithium transition metal composite oxides having a layered rock salt structure include lithium nickel composite oxides, lithium nickel manganese-based composite oxides, lithium nickel cobalt manganese-based composite oxides, lithium nickel cobalt aluminum-based composite oxides and lithium iron nickel manganese-based composite oxides.

Here, in the various composite oxides mentioned above, the metal elements included in the name of the oxide are primary metal elements, but metal elements other than these primary metal elements may also be contained. For example, in the case of the "lithium nickel cobalt manganese-based composite oxide" mentioned above, Li, Ni, Co and Mn are the primary constituent metal elements, but this composite oxide also encompasses oxides containing one or two or more transition metal elements, typical metal elements, and the like, in addition to these primary constituent metal elements. Examples of such additional elements include transition metal elements and typical metal elements such as Mg, Ca, Al, Ti, V, Cr, Si, Y, Zr, Nb, Mo, Hf, Ta, W, Na, Fe, Zn and Sn. Furthermore, additional elements may be metalloid elements such as B, C, Si and P, and non-metallic elements such as S, F, Cl, Br and I. Moreover, this is also true for lithium transition metal composite oxides other than the lithium nickel cobalt manganese-based composite oxide mentioned above.

An example of a lithium nickel cobalt manganese-based composite oxide is a compound represented by formula (1) below:

$$Li_{1+x}Ni_yCo_zMn_{(1-y-z)}M_\alpha O_{2-\beta}A_\beta \qquad \text{Formula (1):}$$

In the formula, the following inequalities are possible: $0 \le x \le 0.7$, $0.1 < y < 0.9$, $0.1 < z < 0.4$, $0 \le \alpha \le 0.1$, and $0 \le \beta \le 0.5$. M can be one or two or more elements selected from the group consisting of Zr, Mo, W, Mg, Ca, Na, Fe, Cr, Zn, Si, Sn and Al. In addition, A can be one or two or more elements selected from the group consisting of F, Cl and Br. From the perspectives of energy density and thermal stability, it is preferable for y and z to satisfy the inequalities $0.3 \le y \le 0.5$ and $0.20 \le z < 0.4$.

In addition, an example of a composite oxide having a spinel structure is a compound represented by formula (2) below:

$$Li_{1+x}Mn_{2-y}M_yO_4 \qquad \text{Formula (2):}$$

Here, M is Ni or a combination of Ni and one or more metal elements selected from the group consisting of Al, Mg, Co, Fe and Zn. In addition, it is preferable for x and y to satisfy the inequalities $0 \le x < 1$ and $0 \le y < 2$.

In addition, a polyanionic compound represented by a formula such as $LiMPO_4$, $LiMVO_4$ or $Li_2MSiO_4$ (M is Ni or a combination of Ni and one or more metal elements selected from the group consisting of Al, Mg, Co, Fe and Zn) may be used as the positive electrode active material.

The shape of the positive electrode active material 12 is not particularly limited, and can be spherical, lamellar, needle-shaped, amorphous, or the like. In addition, the positive electrode active material 12 may be in the form of secondary particles caused by aggregation of primary particles, and may also be in the form of hollow particles.

The average particle diameter (D50) of the positive electrode active material 12 is not particularly limited, but is, for example, 0.05 μm or more and 20 μm or less, preferably 0.5 or more and 15 μm or less, and more preferably 3 μm or more and 15 μm or less.

Moreover, the average particle diameter (D50) of positive electrode active material particles can be determined by means of, for example, a laser diffraction scattering method or the like.

The first coating material 14 includes a nickel oxide having a rock salt type crystal structure (a NaCl type structure). The nickel oxide is represented by the formulae NiO and $Ni_{1-\delta}O$, wherein δ is a real number that satisfies $0 < \delta < 1$. δ is not particularly limited, as long as this is a real number that satisfies $0 < \delta < 1$, but is preferably a real number of 0.0001 or more and 0.01 or less.

As was known in the past, if a nickel oxide (that is to say, a transition metal oxide) is present at the surface of, for example, a positive electrode active material, lithium ion insertion/extraction may be obstructed during battery reactions, depending on conditions. In the present invention, however, because the nickel oxide used as the first coating material 14 and the second coating material 16, which is described later, are both disposed at the surface of the positive electrode active material 12, it is possible to prevent obstruction of lithium ion insertion/extraction by the nickel oxide in the positive electrode active material. Furthermore, by improving lithium ion insertion/extraction efficiency, it is possible for a lithium ion secondary battery to exhibit excellent low temperature output characteristics.

The thickness of the first coating material 14 is not particularly limited as long as the purpose of the present invention can be achieved, but the average thickness T is preferably 0.4 nm or more and 55 nm or less. If the average thickness T exceeds 55 nm, there are concerns that lithium ion insertion/extraction in the positive electrode active material 12 will be obstructed. Therefore, by setting the average thickness T within the range mentioned above, it is possible to prevent obstruction of lithium ion insertion/extraction in the positive electrode active material 12. In addition, from the perspective of more efficiently achieving the advantageous effect of the present invention, the average thickness T is preferably 0.5 nm or more and 50 nm or less.

The average thickness T of the first coating material 14 can be calculated on the basis of observations of the positive electrode material 10 using an electron microscope (a transmission electron microscope (TEM), a scanning electron microscope (SEM), or the like). Specifically, the maximum distance from an interface between the first coating material 14 and the positive electrode active material 12 and the outer surface of the first coating material is determined from, for example, observations using an electron microscope. This can be determined by carrying out at least 10 (20 or more, 30 or more, 50 or more or approximately 100) measurements and averaging the obtained values.

The second coating material 16 contains a titanium oxide. For example, the titanium oxide includes at least one titanium oxide of the titanium oxides (1) and (2) below:

(1) a titanium oxide represented by $TiO_2$ or $Ti_nO_{2n-1}$, wherein n is an integer of 3 or more, and (2) a composite oxide containing Li and Ti.

In cases where the second coating material 16 is (1), the value of n in $Ti_nO_{2n-1}$ is not particularly limited as long as this is an integer of 3 or more, but the value of n is preferably an integer of 3 or more and 9 or less, and more preferably an integer of 3 or more and 5 or less. That is to say, $Ti_nO_{2n-1}$ is more preferably $Ti_3O_5$, $Ti_4O_7$ or $Ti_5O_9$.

In cases where the second coating material 16 is (2), the ratio of the number of atoms of Li relative to the number of atoms of Ti (Li/Ti) can be 0.1 or more and 3 or less. That is to say, the second coating material 16 can include a lithium titanium composite oxide (or lithium titanate: LTO).

Moreover, methods for synthesizing LTOs having a variety of Li and Ti atom number ratios are publicly known. In addition, the ratio of the number of atoms of Li relative to the number of atoms of Ti can be adjusted by subjecting at least two kinds of compound selected from the group consisting of a titanium oxide, a lithium oxide and an LTO to a mechanochemical treatment at a predetermined mixing ratio.

The thickness of the second coating material is not particularly limited as long as the purpose of the present invention can be achieved, but is, for example, preferably 0.1 nm or more and 100 nm or less. The thickness of the second coating material can be determined using, for example, a method such as that described above.

With respect to 100% by weight of the total amount of the positive electrode active material 12, the total amount of Ti contained in the second coating material 16 is preferably a quantity corresponding to 0.005% by weight or more and 6% by weight or less. If the total amount of Ti falls within the range mentioned above, the advantageous effect of the present invention can be more efficiently exhibited. In addition, from the perspective of more efficiently exhibiting the advantageous effect of the present invention, the total amount of Ti is preferably 0.01% by weight or more and 5% by weight or less.

Moreover, the amount of Ti in the coating material can be determined by means of, for example, high frequency inductively coupled plasma emission spectrometry (ICP analysis) or the like.

In the positive electrode material disclosed here, it is preferable for the second coating material 16 to be formed on the disposed first coating material 14 on at least a part of the surface of the positive electrode active material 12. In such a case, the advantageous effect of the present invention can be more reliably exhibited. However, it is not necessarily essential for all of the first coating material 14 and second coating material 16 to be in this state at the surface of the positive electrode active material 12. Moreover, locations where the second coating material 16 is formed on the first coating material 14 are shown inside the rectangular boxes in FIG. 1.

Observing the positive electrode material 10 with an electron microscope, it is possible to confirm that the second coating material 16 is formed on the first coating material 14. In addition, by carrying out, for example, energy dispersion type X-Ray analysis (EDS or EDX), it is possible to analyze the elemental composition of the coating materials and differentiate the coating materials from each other.

Moreover, the coverage ratios of the first coating material and second coating material at the surface of the positive electrode active material 12 can be, for example, approximately 3% or more and 30% or less.

The method for disposing the first coating material 14 on at least a part of the surface of the positive electrode active material 12 is not particularly limited. For example, one method is to mix a positive electrode active material produced using a conventional well-known method or a commercially acquired positive electrode active material with an aqueous alkaline solution and then allow the obtained mixture to rest for a predetermined period of time. Next, removing moisture using an evaporator, it is possible to obtain a positive electrode active material on which a first coating material is formed. Here, the species of aqueous alkaline solution is not particularly limited, and it is possible to select, for example, an aqueous solution of LiOH, an aqueous solution of NaOH, or the like. However, in cases where an aqueous solution of NaOH is used as the aqueous alkaline solution, it is essential to remove sodium ions by means of ion chromatography or the like. In addition, by appropriately altering the concentration of the aqueous alkaline solution and the resting time, it is possible to adjust, for example, the type and average thickness T of the nickel oxide used as the first coating material.

For the second coating material 16, it is possible to first prepare the positive electrode active material 12, on which the first coating material 14 has been disposed, and a titanium oxide to be used as the second coating material 16, and then dispose the second coating material 16 on the surface of the active material 12 using a conventional method (for example, a conventional method such as forming a coating material on an active material).

A particularly preferred example of such a conventional method is a mechanochemical treatment carried out using a variety of mechanochemical apparatuses. For example, using a pulverizing and mixing apparatus such as a ball mill, a planetary mill or a bead mill, it is possible to bring about a desired mechanochemical reaction and, for example, dispose the second coating material 16 on the surface of the positive electrode active material 12.

Specifically, a positive electrode active material (a powdered material) and a titanium oxide (a powdered material) are first introduced into a given mechanochemical apparatus. Next, kinetic energy is applied at a predetermined rotational speed for a predetermined period of time. In this way, it is possible to attach the coating material to the surface of the active material. In addition, following the mechanochemical treatment, a firing treatment may be carried out at a temperature of approximately 200° C. to 1,000° C. (for example, 300° C. to 800° C.).

The presence of the coating material disposed on the surface of the active material can be detected (observed) using a variety of detection means.

For example, it is possible to use an electron microscope, such as the SEM and TEM mentioned above or a scanning transmission electron microscope (STEM). In addition, it is possible to use a means such as EDS (EDX), secondary ion mass spectrometry (SIMS), X-Ray photoelectric spectroscopy (XPS), X-Ray diffraction (XRD) or X-Ray fluorescence analysis (XRF) in order to qualitatively and quantitatively analyze elemental composition, crystallinity, and the like.

The positive electrode material disclosed here has the first coating material and second coating material on at least a part of the surface of the positive electrode active material. In addition, the first coating material contains a nickel oxide having a rock salt structure, and the second coating material contains a titanium oxide. It is possible to improve the low temperature output characteristics of a lithium ion secondary battery.

The mechanism by which this type of advantageous effect can be achieved by the present invention is thought to be as follows.

In cases where a lithium ion secondary battery is operated under harsh low temperature conditions such as −10° C. or lower or −20° C. or lower, the degree of mobility of lithium ions in an electrolyte (a non-aqueous electrolyte solution, a solid electrolyte, or the like) decreases. Therefore, there is a delay in lithium ions reaching the surface of a positive electrode active material, and smooth progression of battery reactions is obstructed. As a result, the output characteristics of lithium ion secondary batteries can deteriorate under such harsh low temperature conditions.

In the present invention, the concentration of lithium ions in an electrolyte is specifically increased in regions close to both the first coating material and the second coating material at the surface of the positive electrode active material. Due to the presence of such regions having high lithium ion concentrations, it is possible to prevent a shortage of lithium ions at the surface of the positive electrode active material. As a result, it is possible to prevent a decrease in output characteristics of the battery even under harsh low temperature conditions such as −10° C. or lower or −20° C. or lower. In addition, because the second coating material is formed on the first coating material at the surface of the positive electrode active material in particular, regions having high lithium ion concentrations can be expanded. It is possible to further improve the low temperature output characteristics of a lithium ion secondary battery.

The positive electrode material disclosed here can also improve the durability of a lithium ion secondary battery in addition to achieving the excellent low temperature output characteristics mentioned above.

In these regions having high lithium ion concentrations, negatively charged oxygen ions and dissolved oxygen can be concentrated at the same time. As a result, the apparent oxygen partial pressure and oxygen concentration increases at the surface of the positive electrode active material. Therefore, release of oxygen from the positive electrode active material is prevented and excellent durability can be exhibited by the lithium ion secondary battery.

The positive electrode material disclosed here can also improve the weather resistance of a lithium ion secondary battery.

If a positive electrode active material is left in an air environment, moisture in the air reacts with the positive electrode active material and lithium ions in the positive electrode active material are consumed. This type of positive electrode active material causes a reduction in the battery capacity of a lithium ion secondary battery. However, even if the positive electrode material disclosed here is left in an air environment and then used to construct a lithium ion secondary battery, the battery capacity of the lithium ion secondary battery does not decrease.

The positive electrode material disclosed here can improve not only low temperature output characteristics such as those mentioned above, but also durability and weather resistance, and can therefore be advantageously used to configure a positive electrode of a lithium ion secondary battery. Therefore, it is possible to provide a lithium ion secondary battery having good battery performance.

Other than providing the positive electrode material disclosed here in an electrode, the method for constructing the lithium ion secondary battery, the materials used, the form of the battery, and the like, are not limited, and may be similar to those used in the past.

For example, it is possible to provide lithium ion secondary batteries having a variety of forms, such as non-aqueous electrolyte secondary batteries having non-aqueous electrolyte solutions as electrolytes (for example, non-aqueous electrolyte lithium ion secondary batteries), all solid state batteries having solid electrolytes as electrolytes (for example, all solid state lithium ion secondary batteries) and secondary batteries having gel-like polymers as electrolytes (for example, lithium ion polymer secondary batteries).

Figure 2:
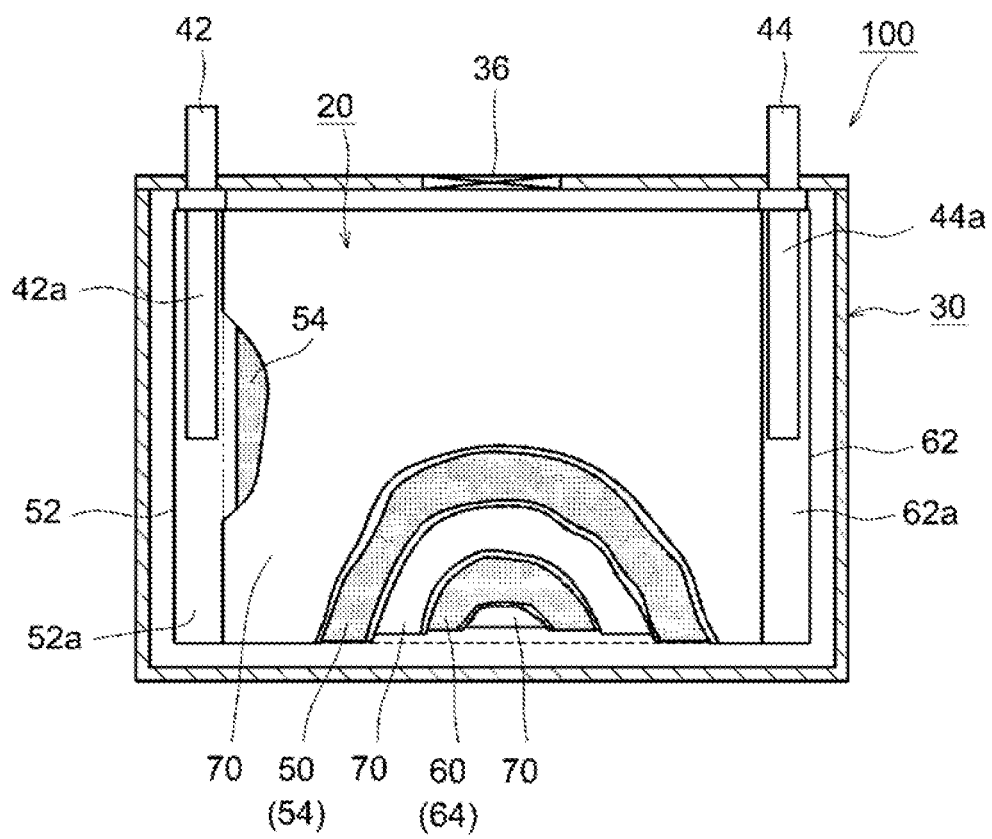
FIG. 2 is a cross-sectional view that schematically illustrates a configuration of a lithium ion secondary battery constructed using a positive electrode material according to one embodiment.
Figure 3:
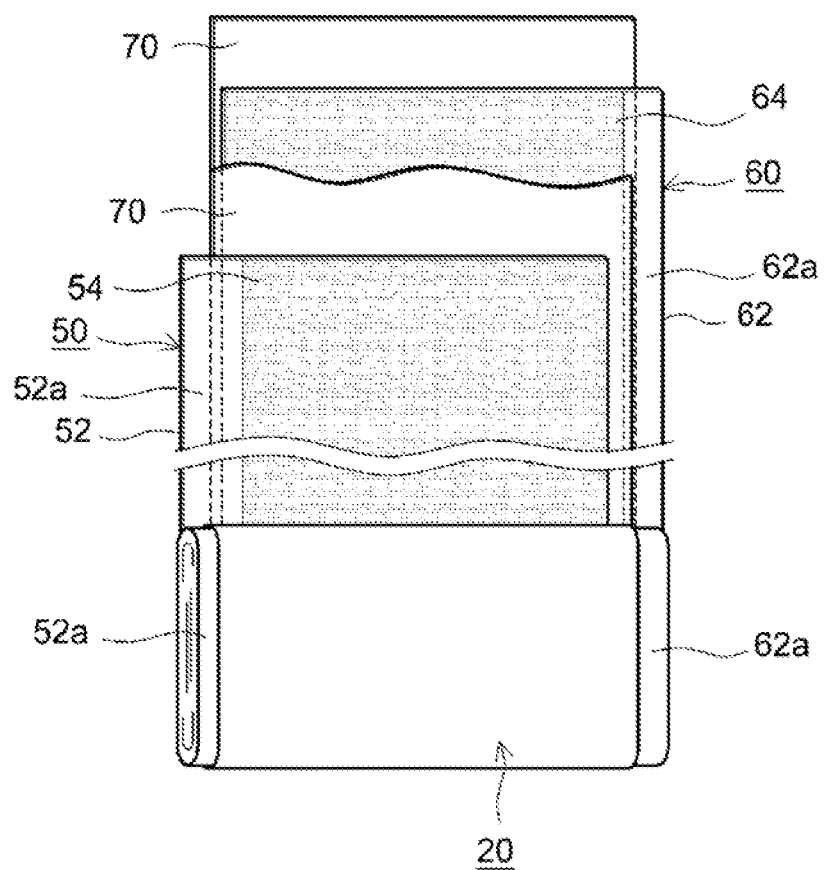
FIG. 3 is a schematic diagram that shows a configuration of an electrode body of a lithium ion secondary battery constructed using a positive electrode material according to one embodiment.

Next, a lithium ion secondary battery able to contain the positive electrode material disclosed here will be explained with reference to FIG. 2 and FIG. 3. FIG. 2 is a cross-sectional view that schematically illustrates a configuration of a lithium ion secondary battery constructed using a positive electrode material according to one embodiment. FIG. 3 is a schematic diagram that shows a configuration of an electrode body 20 of a lithium ion secondary battery constructed using a positive electrode material according to one embodiment.

As shown in the figures, a lithium ion or secondary battery 100 has a flat wound electrode body 20, a battery case 30 and an electrolyte (a non-aqueous electrolyte solution), which is not shown.

The battery case 30 is constituted from a bottomed cuboid main body case having an opening at the top, and a lid which is attached to the opening and seals the opening. The battery case 30 is made from aluminum, for example. A positive electrode terminal 42 for external connection, a negative electrode terminal 44 for external connection and a safety valve 36 are formed on the lid.

The wound electrode body 20 is configured overlaying a long sheet-shaped positive electrode sheet 50, a long sheet-shaped negative electrode sheet 60 and a long sheet-shaped separator 70, and winding in the longitudinal direction.

The positive electrode sheet 50 has a positive electrode active material layer 54 formed by depositing a paste-like (slurry-like) supply material, which is prepared by adding, for example, a non-aqueous solvent to a composition prepared by mixing the positive electrode material disclosed here with an electrically conductive material, a binder, and the like, at a predetermined thickness on one or both surfaces of a positive electrode current collector 52 including a sheet-shaped aluminum foil or the like. In addition, the positive electrode current collector 52 has an uncoated portion 52a on which the positive electrode active material layer 54 has not been coated, and is joined to a tip part 42a of the positive electrode terminal 42.

The negative electrode sheet 60 has a negative electrode active material layer 64 formed by depositing a paste-like (slurry-like) supply material, which is prepared by adding, for example, a non-aqueous solvent to a composition prepared by mixing a negative electrode active material with a binder, a thickening agent, and the like, at a predetermined thickness on one or both surfaces of a negative electrode current collector 62 including a sheet-shaped copper foil or the like. In addition, the negative electrode current collector 62 has an uncoated portion 62a on which the negative electrode active material layer 64 has not been coated, and is joined to a tip part 44a of the negative electrode terminal 44.

In addition, a separator constituted from, for example, a porous polyolefin resin such as polypropylene (PP) or polyethylene (PE) and having a single layer structure or multi-layer structure can be used as the separator 70.

Because explanations of the structure of the lithium ion secondary battery described above, structural materials, and the like, are general and do not particularly characterize the present invention, more detailed explanations and figures have been omitted. Other than using the positive electrode material disclosed here, a person skilled in the art could use conventional materials and production processes to easily construct lithium ion secondary batteries having a variety of forms and sizes.

Several experimental examples relating to the present invention will now be explained, but the present invention is in not limited to these experimental examples.

Experimental Example 1. Investigation of Composition of Coating Materials Construction of Lithium Ion Secondary Battery for Evaluation Example 1

Production of Positive Electrode Active Material

First, $LiNi_{1/3}Co_{1/3}Mn_{1/3}O_2$ particles having a layered structure were produced as a positive electrode active material using a conventional well-known method.

Specifically, sulfates of Ni, Co and Mn were dissolved in water at a Ni:Co:Mn molar ratio of 1:1:1. Neutralizing this aqueous solution while adding NaOH, a composite hydroxide containing Ni, Co and Mn, which was a precursor of a positive electrode active material, was precipitated. This composite hydroxide and lithium carbonate were mixed at a molar ratio of 1:1. $LiNi_{1/3}Co_{1/3}Mn_{1/3}O_2$ particles having a layered structure (a positive electrode active material) were obtained by firing this mixture for 15 hours at a temperature of 800° C. Here, the average particle diameter (D50) of the positive electrode active material was measured using a laser diffraction scattering method, and found to be approximately 10 μm.

Process 1: Formation of First Coating Material

Next, 100 g of the positive electrode active material was mixed with 50 g of an aqueous solution containing 0.1% by weight of LiOH. This mixture was allowed to rest for 2 hours, and moisture was then removed using an evaporator.

In this way, the first coating material was disposed on at least a part of the surface of the positive electrode active material.

Process 2: Formation of Second Coating Material

Next, a $TiO_2$ powder and the positive electrode active material on which the first coating material had been disposed in Process 1 were introduced into a mechanochemical apparatus and subjected to a mechanochemical treatment for 30 minutes at 6,000 rpm. In this way, the second coating material was disposed on at least a part of the surface of the positive electrode active material. Moreover, with respect to 100% by weight of the total amount of the positive electrode active material, the usage quantity of the $TiO_2$ powder was such that the total amount of Ti contained in the second coating material was the quantity (% by weight) shown in Table 1.

The positive electrode material according to Example 1, in which the first coating material and second coating material were disposed on at least a part of the surface of the positive electrode active material, was obtained in this way.

Examples 2 to 4

Positive electrode materials were obtained in the same way as in Example 1, except that the second coating material was formed on the positive electrode active material in Process 2 using the titanium oxides shown in Table 1.

Examples 5 to 10

Positive electrode materials were obtained in the same way as in Example 1, except that the second coating material was formed on the positive electrode active material in Process 2 using lithium titanium composite oxides (LTO) having the Li/Ti ratios shown in Table 1.

Moreover, in Table 1, "LTO" denotes a lithium titanium composite oxide, and Li/Ti denotes the ratio of the number of lithium atoms and the number of titanium atoms.

Comparative Example 1

The positive electrode active material produced in Example 1 ($LiNi_{1/3}Co_{1/3}Mn_{1/3}O_2$) was used without modification as a positive electrode material.

Comparative Examples 2 to 5

The positive electrode active material was not subjected to Process 1, and the first coating material was not disposed on the positive electrode active material. Positive electrode materials were obtained in the same way as in Example 1, except that the second coating material was disposed on the positive electrode active material in Process 2 using the titanium oxides shown in Table 1.

Comparative Examples 6 to 11

The positive electrode active material was not subjected to Process 1, and the first coating material was not disposed on the positive electrode active material. Positive electrode materials were obtained in the same way as in Example 1, except that the second coating material was disposed on the positive electrode active material in Process 2 using LTOs having the Li/Ti ratios shown in Table 1.

Comparative Example 12

Following Process 1, the positive electrode active material was not subjected to Process 2, and the second coating material was not disposed on the positive electrode active material. This was used as a positive electrode material.

Coating Material Observations

The positive electrode materials according to Examples 1 to 10 and Comparative Examples 1 to 12, which were produced in the manner described above, were observed using an electron microscope (TEM). In addition, these positive electrode materials were subjected to elemental analysis by means of EDX.

It was confirmed that the first coating material and second coating material were disposed on at least a part of the surface of the positive electrode active material in the positive electrode materials according to Examples 1 to 10. In addition, it was confirmed that there were locations where the second coating material was formed on the first coating material at the surface of the positive electrode active material.

Meanwhile, the presence of coating materials on the positive electrode active material was not confirmed in the positive electrode material according to Comparative Example 1. It was confirmed that only the second coating material was disposed on at least a part of the surface of the positive electrode active material in the positive electrode materials according to Comparative Examples 2 to 11. It was confirmed that only the first coating material was disposed in the positive electrode material according to Comparative Example 12.

Measurement of Average Thickness of First Coating Material

The average thickness was calculated on the basis of the above-mentioned electron microscope observations for Examples 1 to 10 and Comparative Example 12, in which the first coating material was disposed on at least a part of the surface of the positive electrode active material. Specifically, the average value was calculated after measuring the thickness of approximately 10 first coating material. The results are shown in the corresponding column in Table 1.

Construction of Sample Batteries

Lithium ion secondary batteries for evaluation (hereinafter referred to as "sample batteries") were constructed using the positive electrode materials according to Examples 1 to 10 and Comparative Examples 1 to 12, which were produced in the manner described above.

Specifically a positive electrode slurry having a solid content concentration of 56% by weight was first prepared by weighing out the positive electrode material, poly(vinylidene fluoride) (PVdF) as a binder and acetylene black (AB) as an electrically conductive material at a positive electrode material:PVdF:AB ratio of 80:2:8, and mixing in N-methylpyrrolidone (NMP) as a dispersion medium using a planetary mixer. Using a die coater, this positive electrode slurry was coated in the longitudinal direction of a band-shaped aluminum foil (a positive electrode current collector having a thickness of 15 µm), and then dried at 120° C. The dried positive electrode slurry was then pressed together with the aluminum foil. A band-shaped positive electrode sheet having a positive electrode active material layer on the positive electrode current collector was produced in this way.

In addition, a band-shaped negative electrode sheet having a negative electrode active material layer on a negative electrode current collector was produced using well-known conventional materials and components by means of a conventional method.

A wound electrode body was produced by laminating the positive electrode sheet and the negative electrode sheet, with a separator interposed therebetween, and then winding in the longitudinal direction. Next, a positive electrode current collector member was welded to the positive electrode sheet and a negative electrode current collector member was welded to the negative electrode sheet.

Sample batteries were then constructed by housing the produced electrode body and a non-aqueous electrolyte solution in a battery case.

Sample Battery Activation and Measurement of Initial Capacity

The sample batteries produced in the manner described above were activated and measured in terms of initial capacity.

Specifically, as activation (initial charging), each sample battery was subjected to constant current (CC) charging up to 4.2 V at a current of ⅓ C at a temperature of 25° C. Next, each battery was subjected to constant voltage (CV) charging until the current reached 1/50 C, thereby achieving a fully charged state. Each sample battery was then subjected to CC discharging at a current of ⅓ C to a voltage of 3.0 V. At this point, the discharge capacity was measured and used as the initial capacity.

Measurement of Low Temperature Resistance

Each activated sample battery was adjusted to a voltage of 3.70 V (open circuit voltage). Each sample battery was then placed in an environment at a temperature of −28° C. Here, each sample battery was discharged for 8 seconds at a current of 20 C. The voltage decrease amount ΔV at this point was obtained, and the battery resistance was calculated using the current and this ΔV value. Note that, in Table 1, the resistance values of the sample batteries according to Examples 1 to 10 and Comparative Examples 2 to 12 are normalized using those of the sample battery according to Comparative Example 1 as the reference (1).

Measurement of Capacity Retention Rate (%) Following Durability Test

Each activated sample battery was placed in an environment at a temperature of 60° C. With one cycle being CC charging at a current of 10 C up to 4.2 V and then CC discharging at a current of 10 C to 3.3 V, each activated sample battery was subjected to 500 cycles. The discharge capacity after 500 cycles was calculated using the same method as that used for initial capacity.

Next, the capacity retention rate (%) following a durability test was determined using formula (3) below:

Capacity retention rate (%) following durability test=discharge capacity after 500 charging/discharging cycles/initial capacity    Formula (3):

The results are shown in Table 1.

Measurement of Normalized Capacity Following Weathering Resistance Test

Weathering resistance test was carried out in order to evaluate the weathering resistance of the positive electrode material.

Specifically, the positive electrode sheets according to Examples 1 to 10 and Comparative Examples 1 to 12, which were produced in the manner described above, were placed for 12 hours in a tightly sealed container set to a temperature of 25° C. and a humidity of 100%. Next, using the positive electrode sheets that had been removed from the tightly sealed container, sample batteries for weathering resistance test were produced using the same method as that described above.

Next, as activation (initial charging), each sample battery was subjected to CC charging up to 4.2 V at a current of ⅓ C at a temperature of 25° C. Next, each battery was subjected to CV charging until the current reached 1/50 C, thereby achieving a fully charged state. Each sample battery for weathering resistance test was then subjected to CC discharging at a current of ⅓ C to a voltage of 3.0 V. At this point, the discharge capacity was measured and the discharge capacity following weather resistance testing was calculated. The results are shown in Table 1. Note that, in Table 1, the discharge capacity of the sample batteries according to Examples 1 to 10 and Comparative Examples 2 to 12 are normalized using that of the sample battery according to Comparative Example 1 as the reference (1).

TABLE 1

| | First coating material | | Second coating material | | | Battery performance evaluation | | |
|---|---|---|---|---|---|---|---|---|
| Sample ID | Present (Y/N) | Average thickness (nm) of first coating material | Species | Formed on first coating material? (Y/N) | Ti (%) | Low temperature resistance ratio | Capacity retention rate (%) following durability test | Normalized capacity following weather resistance test |
| Example 1 | Y | 10 | $TiO_2$ | Y | 1 | 0.55 | 89 | 2.01 |
| Example 2 | Y | 10 | $Ti_3O_5$ | Y | 1 | 0.54 | 88 | 2.1 |
| Example 3 | Y | 10 | $Ti_4O_7$ | Y | 1 | 0.56 | 87 | 2.1 |
| Example 4 | Y | 10 | $Ti_5O_9$ | Y | 1 | 0.54 | 89 | 2.13 |
| Example 5 | Y | 10 | LTO (Li/Ti = 0.1) | Y | 1 | 0.57 | 90 | 2.21 |
| Example 6 | Y | 10 | LTO (Li/Ti = 0.5) | Y | 1 | 0.56 | 91 | 2.18 |
| Example 7 | Y | 10 | LTO (Li/Ti = 1) | Y | 1 | 0.53 | 90 | 2.17 |
| Example 8 | Y | 10 | LTO (Li/Ti = 2) | Y | 1 | 0.57 | 88 | 2.13 |
| Example 9 | Y | 10 | LTO (Li/Ti = 2.5) | Y | 1 | 0.53 | 86 | 2.11 |
| Example 10 | Y | 10 | LTO (Li/Ti = 3) | Y | 1 | 0.54 | 89 | 2.12 |
| Comparative Example 1 | N | — | — | N | — | 1 | 40 | 1 |
| Comparative Example 2 | N | — | $TiO_2$ | N | 1 | 0.92 | 51 | 1.04 |
| Comparative Example 3 | N | — | $Ti_3O_5$ | N | 1 | 0.91 | 52 | 1.02 |

TABLE 1-continued

| | First coating material | | Second coating material | | | Battery performance evaluation | | |
| --- | --- | --- | --- | --- | --- | --- | --- | --- |
| Sample ID | Present (Y/N) | Average thickness (nm) of first coating material | Species | Formed on first coating material? (Y/N) | Ti (%) | Low temperature resistance ratio | Capacity retention rate (%) following durability test | Normalized capacity following weather resistance test |
| Comparative Example 4 | N | — | $Ti_4O_7$ | N | 1 | 0.89 | 51 | 0.99 |
| Comparative Example 5 | N | — | $Ti_5O_9$ | N | 1 | 0.9 | 52 | 1.05 |
| Comparative Example 6 | N | — | LTO (Li/Ti = 0.1) | N | 1 | 0.92 | 53 | 1.07 |
| Comparative Example 7 | N | — | LTO (Li/Ti = 0.5) | N | 1 | 0.89 | 52 | 0.98 |
| Comparative Example 8 | N | — | LTO (Li/Ti = 1) | N | 1 | 0.88 | 51 | 1.02 |
| Comparative Example 9 | N | — | LTO (Li/Ti = 2) | N | 1 | 0.91 | 54 | 1.04 |
| Comparative Example 10 | N | — | LTO (Li/Ti = 2.5) | N | 1 | 0.92 | 52 | 0.99 |
| Comparative Example 11 | N | — | LTO (Li/Ti = 3) | N | 1 | 0.91 | 52 | 1.04 |
| Comparative Example 12 | Y | 10 | — | N | — | 1.21 | 45 | 1.02 |

As shown in Table 1, it was confirmed that a lithium ion secondary battery having good low temperature output characteristics, durability and weathering resistance is provided if a specified nickel oxide (a first coating material) and a specified titanium oxide (a second coating material) are disposed on at least a part of the surface of the positive electrode active material.

Experimental Example 2. Investigation of Position of Second Coating Material

In this experimental example, positive electrode materials in which the second coating material was disposed at different positions were produced, and lithium ion secondary batteries constructed using these positive electrode materials were evaluated in the same way as in Experimental Example 1.

Example 11

First, $LiNi_{1/3}Co_{1/3}Mn_{1/3}O_2$ having a layered structure was produced as a positive electrode active material using the same method as that used in Example 1.

This positive electrode active material was washed with a mixed solvent of water and ethanol. Next, Process 1 was carried out in the same way as in Example 1 so as to dispose the first coating material on the positive electrode active material. Next, a positive electrode material according to Example 11 was produced by treating the positive electrode active material with a solution of a diethyl sulfate salt of a vinylpyrrolidone-N, N-dimethylaminoethyl methacrylate copolymer, and disposing an LTO having a predetermined Li/Ti ratio as the second coating material using a barrel sputtering apparatus. Through electron microscope observations and EDX analysis, it was confirmed that the first coating material and second coating material had been formed. Next, a sample battery was constructed using the same materials and processes as described above, except that the positive electrode materials according to Example 11 were used, and evaluated in the same way as in Experimental Example 1. The results are shown in Table 2.

TABLE 2

| | First coating material | | Second coating material | | | Battery performance evaluation | | |
| --- | --- | --- | --- | --- | --- | --- | --- | --- |
| Sample ID | Present (Y/N) | Average thickness (nm) of first coating material | Type | Formed on first coating material? (Y/N) | Ti (%) | Low temperature resistance ratio | Capacity retention rate (%) following durability test | Normalized capacity following weather resistance test |
| Example 7 | Y | 10 | LTO (Li/Ti = 1) | Y | 1 | 0.53 | 90 | 2.17 |
| Example 11 | Y | 10 | LTO (Li/Ti = 1) | N | 1 | 0.72 | 74 | 1.62 |

Electron microscope observations and EDX analysis confirmed that the first coating material and second coating material were disposed on at least a part of the surface of the positive electrode active material in the positive electrode material according to Example 11. However, it was not confirmed that the second coating material was formed on the first coating material.

As shown in Table 2, it was confirmed that a lithium ion secondary battery having good low temperature output characteristics, durability and weather resistance is provided if a first coating material and a second coating material are disposed on at least a part of the surface of the positive electrode active material. It was confirmed that superior battery characteristics are exhibited if the second coating material is formed on the first coating material.

Experimental Example 3. Investigation of Average Thickness of First Coating Material In this experimental example, positive electrode materials in which the average coating thickness of the first coating material was different were produced, and lithium ion secondary batteries constructed using these positive electrode materials were evaluated in the same way as in Experimental Example 1.

Examples 12 to 20

Positive electrode materials according to Examples 12 to 20 were produced in the same way as in Example 7, except that in Process 1, the concentration of the aqueous solution of LiOH that is mixed with the positive electrode active material and the length of time for which the mixture of the positive electrode active material and the aqueous solution of LiOH was allowed to rest were altered as appropriate. Through electron microscope observations and EDX analysis, it was confirmed that the first coating material and second coating material had been formed. Next, sample batteries were constructed using the same materials and processes as described above, except that the positive electrode materials according to Example 12-20 were used, and evaluated in the same way as in Experimental Example 1. The results are shown in Table 3.

As shown in Table 3, electron microscope observations and EDX analysis confirmed that the first coating material and second coating material were disposed on at least a part of the surface of the positive electrode active material in the positive electrode materials according to Examples 12 to 20. In addition, the position at which the second coating material was formed on the first coating material was confirmed.

As shown in Table 3, it was confirmed that a lithium ion secondary battery having good low temperature output characteristics, durability and weather resistance is provided if a first coating material and a second coating material are disposed on at least a part of the surface of the positive electrode active material. In addition, it was confirmed that from the perspective of improving battery characteristics, the average thickness of the first coating material is preferably 0.4 nm to 55 nm, and more preferably 0.5 nm to 50 nm.

Experimental Example 4. Investigation of Total Amount of Ti Contained in Second Coating Material In this experimental example, positive electrode materials in which the total amount of Ti contained in the second coating material was different were produced, and lithium ion secondary batteries constructed using these positive electrode materials were evaluated in the same way as in Experimental Example 1.

Examples 21 to 28

In Process 1, the concentration of the aqueous solution of LiOH that is mixed with the positive electrode active material and the interval for which the mixture of the

TABLE 3

| | First coating material | | Second coating material | | | Battery performance evaluation | | |
|---|---|---|---|---|---|---|---|---|
| Sample ID | Present (Y/N) | Average thickness (nm) of first coating material | Type | Formed on first coating material? (Y/N) | Ti (%) | Low temperature resistance ratio | Capacity retention rate (%) following durability test | Normalized capacity following weather resistance test |
| Example 12 | Y | 0.4 | LTO (Li/Ti = 1) | Y | 1 | 0.71 | 73 | 1.63 |
| Example 13 | Y | 0.5 | LTO (Li/Ti = 1) | Y | 1 | 0.56 | 86 | 2.13 |
| Example 14 | Y | 1 | LTO (Li/Ti = 1) | Y | 1 | 0.54 | 89 | 2.17 |
| Example 15 | Y | 2 | LTO (Li/Ti = 1) | Y | 1 | 0.56 | 88 | 2.21 |
| Example 16 | Y | 5 | LTO (Li/Ti = 1) | Y | 1 | 0.54 | 87 | 2.17 |
| Example 17 | Y | 10 | LTO (Li/Ti = 1) | Y | 1 | 0.53 | 91 | 2.18 |
| Example 18 | Y | 25 | LTO (Li/Ti = 1) | Y | 1 | 0.55 | 90 | 2.13 |
| Example 19 | Y | 50 | LTO (Li/Ti = 1) | Y | 1 | 0.54 | 88 | 2.13 |
| Example 20 | Y | 55 | LTO (Li/Ti = 1) | Y | 1 | 0.74 | 74 | 1.65 | positive electrode active material and the aqueous solution of LiOH was allowed to rest were altered as appropriate so as to achieve an average thickness of 3 nm for the first coating material. In addition, in Process 2, a LTO (Li/Ti=1) was added so that the amount of Ti contained in the second coating material was an amount (% by weight) shown in Table 4, with the mass of the overall positive electrode active material being taken to be 100% by weight, and a mechanochemical treatment was then carried out. Other than this, positive electrode materials according to Examples 21 to 28 were produced in the same way as in Example 1. Through electron microscope observations and EDX analysis, it was confirmed that the first coating material and second coating material had been formed on the surface of the positive electrode active material. Next, sample batteries were constructed using the same materials and processes as described above, except that the positive electrode materials according to Example 21-28 were used, and evaluated in the same way as in Experimental Example 1. The results are shown in Table 4.

Experimental Example 5. Investigation of Species of Positive Electrode Active Material In this experimental example, positive electrode materials in which the species of positive electrode active material was different were produced, and lithium ion secondary batteries constructed using these positive electrode materials were evaluated in the same way as in Experimental Example 1.

Examples 29 to 31

Positive electrode materials according to Examples 29 to 31 were produced in the same way as in Example 7, except that lithium transition metal composite oxides shown in the corresponding column in Table 5 were used as the positive electrode active material. Through electron microscope observations and EDX analysis, it was confirmed that the first coating material and second coating material had been formed on the surface of the positive electrode active

TABLE 4

| | First coating material | | Second coating material | | | Battery performance evaluation | | |
| --- | --- | --- | --- | --- | --- | --- | --- | --- |
| | | Average | | | | | Capacity | Normalized |
| Sample ID | Present (Y/N) | thickness (nm) of first coating material | Type | Formed on first coating material? (Y/N) | Ti (%) | Low temperature resistance ratio | retention rate (%) following durability test | capacity following weather resistance test |
| Example 21 | Y | 3 | LTO (Li/Ti = 1) | Y | 0.005 | 0.72 | 70 | 1.62 |
| Example 22 | Y | 3 | LTO (Li/Ti = 1) | Y | 0.01 | 0.56 | 87 | 2.14 |
| Example 23 | Y | 3 | LTO (Li/Ti = 1) | Y | 0.1 | 0.55 | 88 | 2.17 |
| Example 24 | Y | 3 | LTO (Li/Ti = 1) | Y | 1 | 0.54 | 89 | 2.21 |
| Example 25 | Y | 3 | LTO (Li/Ti = 1) | Y | 2 | 0.53 | 91 | 2.13 |
| Example 26 | Y | 3 | LTO (Li/Ti = 1) | Y | 4 | 0.54 | 88 | 2.17 |
| Example 27 | Y | 3 | LTO (Li/Ti = 1) | Y | 5 | 0.57 | 87 | 2.14 |
| Example 28 | Y | 3 | LTO (Li/Ti = 1) | Y | 6 | 0.74 | 71 | 1.64 |

As shown in Table 4, electron microscope observations and EDX analysis confirmed that the first coating material and second coating material were disposed on at least a part of the surface of the positive electrode active material in the positive electrode materials according to Examples 21 to 28. In addition, the position at which the second coating material was formed on the first coating material was confirmed.

As shown in Table 4, it was confirmed that a lithium ion secondary battery having good low temperature output characteristics, durability and weather resistance is provided if a first coating material and a second coating material are disposed on at least a part of the surface of the positive electrode active material. In addition, it was confirmed that from the perspective of improving battery characteristics, the total amount of Ti contained in the second coating material is preferably 0.005% by weight to 6% by weight, and more preferably 0.01% by weight to 5% by weight, with respect to 100% by weight of the total amount of the positive electrode active materials.

material. Next, sample batteries were constructed using the same materials and processes described above, except that the positive electrode materials according to Example 29-31 were used, and evaluated in the same way as in Experimental Example 1. The results are shown in Table 5.

Comparative Examples 12 to 14

Lithium transition metal composite oxides shown in the corresponding column in Table 5 were used without modification as positive electrode materials. In addition, the surface of the positive electrode materials was subjected to electron microscope observations and EDX analysis. Next, sample batteries were constructed using the same materials and processes as described above, except that the positive electrode materials according to Comparative Examples 12 to 14 were used, and evaluated in the same way as in Experimental Example 1. The results are shown in Table 5.

TABLE 5

| | | First coating material | | Second coating material | | | Battery performance evaluation | | |
|---|---|---|---|---|---|---|---|---|---|
| Sample ID | Type of positive electrode active material | Present (Y/N) | Average thickness (nm) of first coating material | Type | Formed on first coating material? (Y/N) | Ti (%) | Low temperature resistance ratio | Capacity retention rate (%) following durability test | Normalized capacity following weather resistance test |
| Example 29 | $LiNiO_2$ | Y | 10 | LTO (Li/Ti = 1) | Y | 1 | 0.55 | 90 | 2.11 |
| Comparative Example 12 | | N | — | — | N | — | 1 | 40 | 1 |
| Example 30 | $LiNi_{0.5}Mn_{1.5}O_4$ | Y | 10 | LTO (Li/Ti = 1) | Y | 1 | 0.56 | 91 | 2.16 |
| Comparative Example 13 | | N | — | — | N | — | 1 | 40 | 1 |
| Example 31 | $LiNi_{0.8}Co_{0.15}Al_{0.05}O_2$ | Y | 10 | LTO (Li/Ti = 1) | Y | 1 | 0.54 | 93 | 2.15 |
| Comparative Example 14 | | N | — | — | N | — | 1 | 40 | 1 |

As shown in Table 5, electron microscope observations and EDX analysis confirmed that the first coating material and second coating material were disposed on at least a part of the surface of the positive electrode active material in the positive electrode materials according to Examples 29 to 31. In addition, the position at which the second coating material was formed on the first coating material was confirmed. In addition, the formation of coating material was not confirmed on the positive electrode active material in the positive electrode materials according to Comparative Examples 12 to 14.

As shown in Table 5, it was confirmed that, regardless of the species of positive electrode active material that constitutes the positive electrode material, a lithium ion secondary battery having good low temperature output characteristics, durability and weather resistance is provided if a first coating material and a second coating material are disposed on at least a part of the surface of the positive electrode active material.

From the results shown above, it has been confirmed that excellent low temperature output characteristics, durability and weather resistance can be exhibited by a lithium ion secondary battery according to the positive electrode material disclosed here.

Specific examples of the present invention have been explained in detail above, but these are merely examples, and do not limit the scope of the claims. The features set forth in the claims also encompass modes obtained by variously modifying or altering the specific examples shown above.

What is claimed is:

1. A positive electrode material for a positive electrode of a lithium ion secondary battery, comprising:
   a positive electrode active material including a compound capable of storing and releasing lithium ions;
   a first coating material disposed on at least a part of a surface of the positive electrode active material; and
   a second coating material disposed on at least a part of the surface of the positive electrode active material,
   wherein
   the first coating material includes a nickel oxide having a rock salt structure,
   the nickel oxide is a nickel oxide represented by the formulae NiO and $Ni_{1-\delta}O$, wherein $\delta$ is a real number satisfying $0<\delta<1$,
   the second coating material includes a titanium oxide, and
   the titanium oxide includes at least one titanium oxide of the titanium oxides (1) and (2) below:
   (1) a titanium oxide represented by $TiO_2$ or $Ti_nO_{2n-1}$, wherein n is an integer of 3 or more, and
   (2) a composite oxide containing Li and Ti.

2. The positive electrode material according to claim 1, wherein the second coating material is formed on the disposed first coating material on at least a part of the surface of the positive electrode active material.

3. The positive electrode material according to claim 1, wherein the first coating material has an average thickness of 0.4 nm or more and 55 nm or less based on an electron microscope observation.

4. The positive electrode material according to claim 2, wherein the first coating material has an average thickness of 0.4 nm or more and 55 nm or less based on an electron microscope observation.

5. The positive electrode material according to claim 1, with respect to 100% by weight of the total amount of the positive electrode active material, the total amount of Ti in the second coating material is an amount corresponding to 0.005% by weight or more and 6% by weight or less.

* * * * *